UNITED STATES PATENT OFFICE.

EMIL WÜRTHNER, OF STUTTGART, GERMANY, ASSIGNOR TO THE FIRM OF G. SIEGLE & CO., G. M. B. H., OF STUTTGART, GERMANY.

LAKE FROM SULFONATED AZO DYES.

No. 918,244.　　　Specification of Letters Patent.　　　Patented April 13, 1909.

Application filed January 2, 1908. Serial No. 409,016.

*To all whom it may concern:*

Be it known that I, EMIL WÜRTHNER, a citizen of the German Empire, residing at Stuttgart, Würtemberg, Germany, have invented certain new and useful Improvements in Processes for Making Dye-Lakes of Sulfonated Azo Dyes; and I do hereby declare the following to be a full, clear, and exact description of the invention, such as will enable others skilled in the art to which it appertains to make and use the same.

The manufacture of dye lakes of the sulfonated azo dyes has hitherto usually been done by treating the completely formed azo dye at a suitable temperature in an aqueous solution or in suspension with metallic salt solutions, substances which are insoluble in water, such as alumina, blanc-fixe and heavy-spar, lithopone, kaolin and the like being also frequently employed in suspension in the dye solutions. The formation of lake then takes place by the acid of the salt of the dye stuff combining with the base of the metallic salt by a double decomposition, that is to say where chlorid of barium and the sodium salt of the dye stuff are used the baryta salt of the sulfo-acid and common salt are formed. In place of the dye itself, the free dyeing acid has also been employed hitherto in an aqueous solution or in suspension. In no case however in making the lake of the sulfonated azo dyes was the start made from the components of the same, but the lake formation was first undertaken after these components had been combined with one another.

Now according to the present invention it is not at all necessary, for making the lake of the sulfonated azo dyes, to completely produce the latter before the formation of the lake, and then only decompose it with the metallic salts which are soluble in water. The formation of the lake is effected by the metallic salts being added, before the formation of the dye, to any one of the components by the combination of which the dye is formed, the coupling or combination being then effected in the ordinary way. The formation of the lake then takes place directly, as is evident without further explanation, and successively in proportion as the combination progresses. The reaction according to the present invention thus takes place in a totally different way than by the action of the finished dye on the metallic salt, because the dye is separated out as dye lake *in statu nascendi* and in addition to the already formed dye lake up to the end of the dye lake formation, there is always an uncombined dye component present. It is impossible that this process should take place with the methods employed hitherto for the making of the lake and in it lies the object of the invention. In place of metallic salt solutions, in this improved process precisely as in the older processes, metallic-oxids, -hydroxids or -carbonates may be employed.

According to the process constituting this invention, dye lakes of the sulfonated azo dyes may be made in a substantially simpler manner, considerably cheaper and also more uniformly than is possible with the older methods in which the lake is produced by the round-about way of first making the dye.

Example: 22.3 parts beta-naphthylamin alpha-sulfo-acid are dissolved with 5.5 parts of calcined soda and the resultant sodium salt is after filtration and the addition of 7 parts of sodium nitrite at about 10° C. diazotized with 38 parts of hydrochloric acid of 20° Bé. To the diazo compound which is then obtained in the form of a brownish paste there is added after dilution with cold water 20 parts of crystalline chlorid of barium dissolved in five times its weight of water and 9 parts of soda lye of 40° Bé. Then under constant stirring the fluid hereinbefore described is added to a cold solution of 15 parts beta naphthol in 13.5 parts of soda lye of 40° Bé. After the reaction which proceeds smoothly is ended, the resultant lake is washed by decantation two or three times and then heated to boiling point. It corresponds to the dye stuff lake which can be obtained with chlorid of barium from commercial lithol red R.

All the dye lakes produced according to the foregoing process may be brought into commerce directly as concentrated dye lake, dry or in an aqueous paste, or even in a wet or dry condition as a mixture with suitable substances.

I declare that what I claim is:—

5. The process of making dye lakes which consists in first mixing a metallic compound forming a lake base with one of the components of a sulfonated azo dye and then combining the mixture with the remaining component.

In testimony whereof I affix my signature, in presence of two witnesses.

EMIL WÜRTHNER.

Witnesses:
 JEAN GULDEN,
 A. B. DRAUTZ.